United States Patent [19]

Bossler

[11] Patent Number: 4,551,045

[45] Date of Patent: Nov. 5, 1985

[54] COUNTERSINK CORE DRILL ASSEMBLY AND METHOD OF UTILIZING SAME

[76] Inventor: Joseph Bossler, 421 S. Baldwin Ave., Arcadia, Calif. 90016

[21] Appl. No.: 588,229

[22] Filed: Mar. 12, 1984

[51] Int. Cl.[4] .............................................. B23B 51/04
[52] U.S. Cl. ................................... 408/206; 175/330; 408/59
[58] Field of Search .................... 408/56, 57, 60, 58, 408/59, 61, 204, 203.5, 206, 36, 118; 175/387, 393, 213, 214, 218, 173, 202, 203, 262, 315, 330, 400, 404

[56] References Cited

U.S. PATENT DOCUMENTS

| | | | |
|---|---|---|---|
| 2,389,512 | 11/1945 | Humason | 175/400 X |
| 2,490,512 | 12/1949 | Deely | 175/330 X |
| 2,545,195 | 3/1951 | Crake | 175/400 X |
| 2,587,231 | 2/1952 | Schierding | 175/387 |
| 2,599,770 | 6/1952 | Marcerou | 408/59 |
| 3,543,613 | 12/1970 | Obloy | 408/57 |
| 3,778,179 | 12/1973 | Rivas | 408/206 |
| 3,833,073 | 9/1974 | Carver | 175/330 X |

FOREIGN PATENT DOCUMENTS 431787  11/1911  France ................. 175/387

Primary Examiner—Gil Weidenfeld
Assistant Examiner—Glenn L. Webb
Attorney, Agent, or Firm—Sellers and Brace

[57] ABSTRACT

Disclosed is a core drill assembly and method of using the same to drill a countersunk hole through a concrete slab, wall or the like masonary member. The assembly utilizes concentric inner and outer core drills, the longer smaller one of which is provided with flushing fluid outlets rearwardly of the front end of the outer or countersink drill and provided with closure means for confining fluid flow to the inner drill when that drill is in use, and for diverting the flow to the outer drill while performing the countersink operation. The two drills have separate coupling facilities thereby permitting the substitution of drills of any selected relative sizes.

9 Claims, 2 Drawing Figures

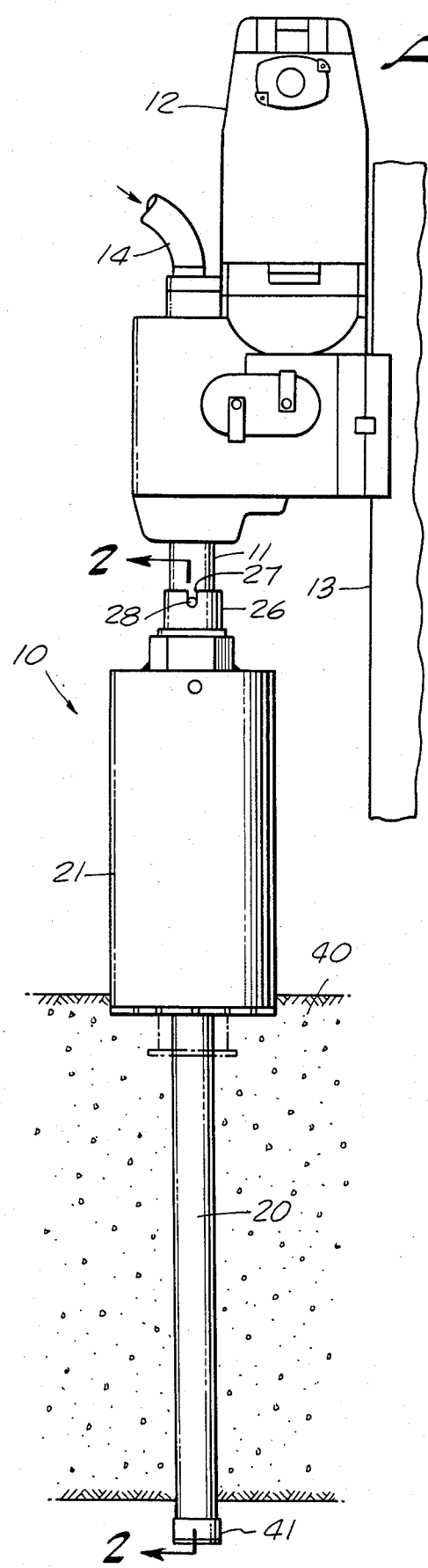
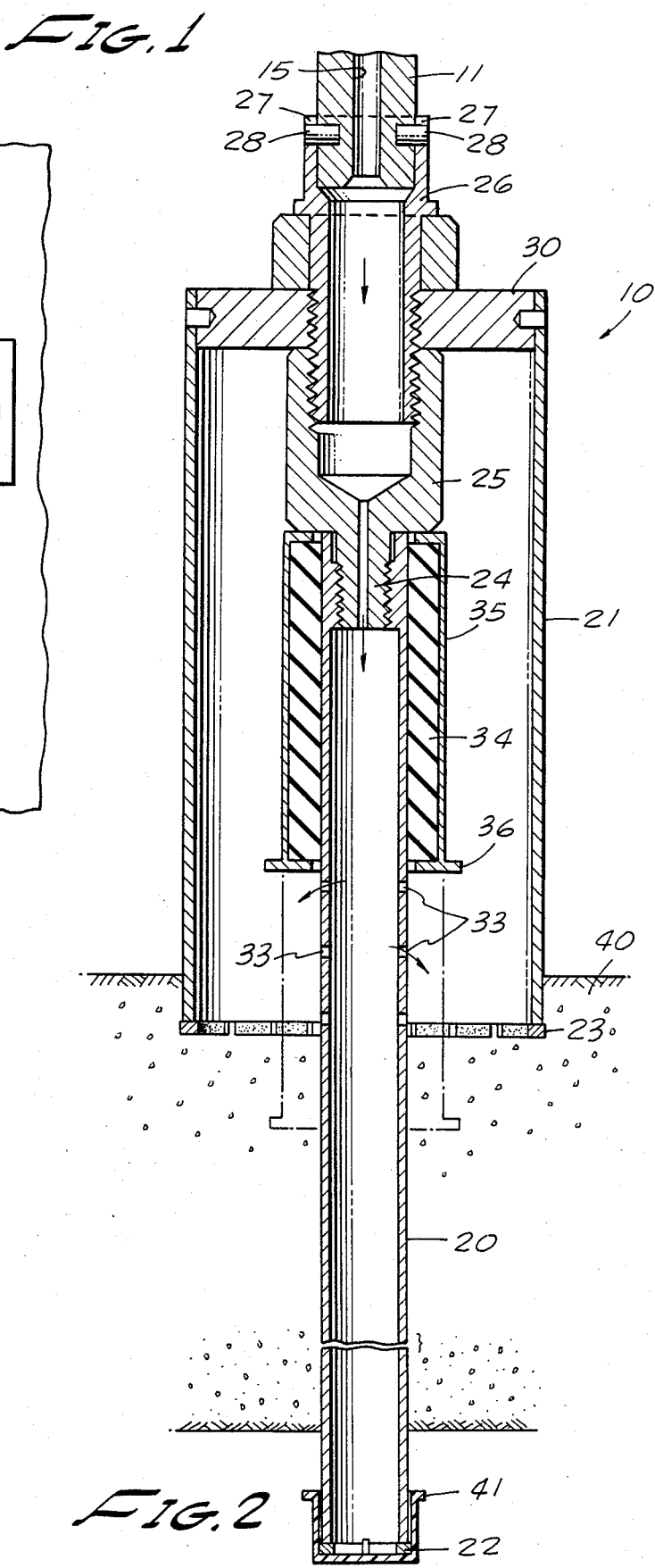

COUNTERSINK CORE DRILL ASSEMBLY AND METHOD OF UTILIZING SAME

This invention relates to core drills, and more particularly to an improved countersink core drill assembly and method of utilizing the same to drill concrete slabs, walls or the like masonary structures.

BACKGROUND OF THE INVENTION

The need for boring countersink holes in concrete and other masonary has long existed to meet a variety of needs wherever concrete or masonary is used. Various drilling assemblies for satisfying these needs have been proposed but all are subject to various shortcomings. Typical of these prior proposals are disclosed in U.S. Pat. Nos. to Carver 3,833,073; Salter 3,736,995; Barron 2,978,846 and Crake 2,545,195. Carver proposes a combination drill provided with an inner circular saw cutter specially designed for cutting through metalwork oftentimes employed in concrete building structures having various utility system housings and fittings embedded therein. It has provision for supplying flushing fluid for the core drill but it lacks and has no need for supplying cutting fluid to the circular saw and consequently no need for shifting the flow between these diverse cutters. Salter discloses a core drill with a stepped cutting ring suitable for cutting through a concrete structure and into a metallic utility assembly embedded in the concrete. The smaller diameter cutting ring is used to cut through the metal housing. When the larger diameter portion of the cutting ring contacts the metal fitting a distinctive sound is generated advising the operator that the hole has been cut leaving an inwardly extending metallic flange projecting inwardly from the sidewall of the concrete bore. Barron proposes a drill for hard materials having a stepped cutting end but having no provision for flushing fluid. Crake provides a stepped drill bit of the non-core type with means for drilling a large diameter bore opening at its bottom into a smaller diameter well of predetermined depth. These various prior designs are designed to meet a particular need and are subject to shortcomings and disadvantages avoided by my invention.

SUMMARY OF THE INVENTION

My invention provides a versatile core drill for quickly and economically drilling a countersunk hole in concrete slabs, walls and other masonary, using a pair of core drills of any desired relative diameters.

The two core drills are mounted concentrically of one another to coupling means for holding the assembly detachably connected to the rotary shank of a power unit equipped with flushing fluid facilities. The assembly includes provision for supplying flushing fluid selectively to either of the drills. This is achieved by providing the inner drill body with outlet openings between its opposite ends and inwardly of the cutting end of the outer drill. A sleeve valve manually shiftable lengthwise of the inner drill is usable to confine flow to the inner drill while in use to cut a bore. Thereafter, the sleeve valve is shiftable towards the rear end of the two drills thereby permitting the fluid to flow outwardly through these openings aided by a closure cap having a press fit over the cutting of the inner drill after it has passed through the wall or slab. The assembly is continued in use with the larger outer drill cutting a countersink bore of the desired depth. The threaded coupling holding the two drills to the power unit are specially designed to permit substituting inner and outer drills of any desired relative size.

Accordingly, it is a primary object of this invention to provide an improved countersink core drill assembly and method for utilizing the same to bore a stepped hole in concrete masonary and the like.

Another object of the invention is the provision of a simple, rugged countersink core drill assembly having provision for selectively supplying flushing fluid to either the inner drill or to the surrounding countersink drill.

Another object of the invention is the provision of a core drill assembly having concentric inner and outer core drills provided with coupling means for holding the assembly to the drive shank of a power unit and permitting the substitution of drills of different relative diameters.

These and other more specific objects will appear upon reading the following specification and claims and upon considering in connection therewith the attached drawing to which they relate.

Referring now to the drawing in which a preferred embodiment of the invention is illustrated:

FIG. 1 is an elevational view showing an illustrative embodiment of a countersink core drill assembly in use to bore a countersink hole through concrete or the like masonary; and FIG. 2 is a cross sectional view on an enlarged scale taken along line 2—2 on FIG. 1.

Referring to FIG. 1, there is shown an illustrative embodiment of my improved countersink drill assembly, designated generally 10, coupled to the output shank 11 of a conventional power unit 12 slidable vertically of a supporting pedastal 13. The power unit is equipped with a flexible hose 14 connectible to a source of flushing fluid and in communication with a central bore 15 in shank 11. Drill assembly 10 includes an inner core drill 20 of relatively small diameter axially of an outer larger diameter core drill 21. The front or forward ends of each of the drills 20 and 21 are provided with the usual ring of cutting teeth 22, 23 having diamond chips or the like fused to the three sides of the ring in cutting contact with the material being drilled. The rear end of the inner drill 20 is provided with internal threads matable with the threaded shank 24 of a tubular coupling 25. The internal threads at the other end of coupling 25 are matable with an adapter 26. The upper or inlet end of adapter 26 has a pair of axial slots 27 for receiving and seating the outer end of a pair of drive pins 28 seated in and projecting from the diametrically opposed sides of shank 11. Adapter 26 has a snug telescopic fit over the end of this shank and is constrained to rotate with the shank when the power unit 12 is in operation.

The outer or countersink drill 21 is suitably secured to a disc 30 provided with a threaded bore matable with the threads of adapter 26.

The rearward portion of inner drill 20 is provided with a plurality of outlets for dispensing flushing fluid into the interior of the outer drill 21 when the latter is in use to drill a countersink hole. At other times and when the inner drill is in use to drill a bore, outlets 33 are closed by a flow control device comprising a resilient sleeve having a snug sliding fit over the exterior of drill 20 and mounted within an outer housing 35. The sleeve 34 is retained within housing 35 by a closure ring 36 which projects radially outwardly beyond the housing to provide a finger grip engageable by the operator's fingers to shift the flow control device axially of the drill between a position closing openings 33 and a position clear of these openings.

In use, the countersink drill assembly 10 is assembled to coupling 25 and adapter 26 and telescoped axially over the outer end of shank 11 of the power unit. The power unit is then slidably supported on the pedestal 13 with the cutting end of drill 20 in contact with the concrete slab or wall 40 to be drilled. Prior to starting the operation the operator shifts the flow control member forwardly to cover ports 33 thereby confining the flow of flushing fluid to the inner drill. The portion of drill 20 projecting beyond the forward end of outer drill 21 is sufficiently long to penetrate the slab without interference from the drill 21. The power unit is operated in known manner to drill the smaller diameter opening through the masonary as flushing fluid is supplied to the cutting end of the inner core drill. The drilling equipment is then withdrawn and the separated core is removed from drill 20 through its front end in accordance with customary practice. Also the flow control unit 34, 35 is shifted rearwardly to the position shown in FIG. 2 to permit free flow of flushing fluid into the interior of the outer drill 21. The drilling assembly is now returned to the bore hole with the cutting ring 23 of the outer drill positioned close to or bearing against the face of the masonary 40. The snug-fitting resilient cup shaped cap 41 is then telescoped over the front end of drill 20 on the far side of the masonary. This prevents the escape of essentially all cutting fluid from the smaller drill so that an ample flow of fluid takes place through outlets 33 to provide flushing fluid for drilling the countersink to a desired depth. Typically, the countersink bore is relatively shallow compared to the length of the bore usually drilled by the inner drill. The core formed by this countersink drill does not hamper the flow of flushing fluid objectionably nor is the depth of the countersink bore sufficiently long for its core to engage the forward end of the flow control device.

While the particular countersink core drill assembly and method of utilizing the same herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A countersink core drill for use in drilling a stepped bore in a concrete slab, wall or the like comprising:
    concentric inner and outer core drills including a relatively long smaller diameter inner core drill having its forward end projecting substantially beyond the forward end of said larger diameter outer core drill;
    a cutting ring attached to the forward end of each of said core drills;
    means for detachably securing the rear ends of said inner and outer drills as a unit to the rotary shank of a power unit;
    the main body of said inner drill having outlet openings in the wall thereof for a chip flushing fluid positioned rearwardly of the forward end of said outer drill; and
    closure means for said outlet openings movably supported between the ends of said outer drill and movable between positions to control flow from said openings.

2. A core drill as defined in claim 1 characterized in the provision of means substantially blocking the flow of flushing fluid from the front end of said inner drill after the latter has penetrated said slab or wall and while said outer drill is in use to drill a countersink bore.

3. A core drill as defined in claim 1 characterized in that said closure means for said flushing fluid outlet openings includes a sleeve encircling said inner drill and having a fluid tight sliding fit therewith and slidable therealong to control the flow of flushing fluid through said outlet openings.

4. A core drill as defined in claim 3 characterized in that said sleeve controlling the flow of flushing fluid is manually manipulatable at the forward end of said outer drill.

5. A core drill as defined in claim 1 characterized in that said closure means for said flushing fluid outlet openings comprises a tubular housing encircling said inner drill and held frictionally in fluid tight engagement therewith by resilient gasket material, said closure means being manually shiftable axially of said inner drill between a first position preventing the flow of flushing fluid outwardly through said outlet openings and a second position permitting the flow of flushing fluid.

6. A core drill as defined in claim 1 characterized in the provision of separate means for holding each of said inner and outer drills to the drive shank of a power tool for rotating each of said drills whereby a drill of different diameter may be substituted for either or both of said inner and outer drills.

7. A core drill as defined in claim 6 characterized in that each of said inner drills has a threaded inlet end adapted for use in holding the same detachably assembled to said rotary shank of a power unit.

8. That method of drilling a countersunk hole in a concrete slab or wall, or the like which comprises:
    utilizing a pair of concentric inner and outer core drills wherein said inner drill is longer and smaller in diameter and protrudes forwardly beyond the front cutting end of said outer drill;
    providing means for holding said inner and outer drills detachably assembled to a rotary power unit equipped with means supplying flushing fluid to said drills;
    utilizing said power unit to drive said inner drill and supply the same with flushing fluid while boring a hole through a concrete slab or wall; and
    substantially cutting off the flow of flushing fluid from the forward end of said inner drill and diverting the flow of flushing fluid into the interior of said outer drill while utilizing said power unit and said outer drill to drill a larger diameter countersunk bore centered about the inlet of said first drilled bore.

9. That method defined by claim 8 characterized in the steps of providing the wall of said inner drill with outlet openings for flushing fluid discharging into said outer drill between the opposite ends thereof; and providing said inner drill with valve sleeve means slidable along the exterior thereof for use in selectively blocking and permitting the flow of flushing fluid outwardly through said outlet openings.

* * * * *